(12) United States Patent
Barton et al.

(10) Patent No.: US 8,032,438 B1
(45) Date of Patent: Oct. 4, 2011

(54) METHOD AND SYSTEM FOR AUTOMATING FRAUD AUTHORIZATION STRATEGIES

(75) Inventors: Thomas C. Barton, Newark, DE (US);
Harold Paulson, Jr., Chadds Ford, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 12/763,668

(22) Filed: Apr. 20, 2010

Related U.S. Application Data

(63) Continuation of application No. 12/046,630, filed on Mar. 12, 2008, now Pat. No. 7,707,089.

(51) Int. Cl.
*G06Q 40/00* (2006.01)

(52) U.S. Cl. ............... 705/35; 705/36; 705/37; 705/38; 705/39; 705/40; 705/41; 705/44; 705/10; 705/18; 705/7.31; 235/380; 283/66.1; 340/425.5

(58) Field of Classification Search ............. 705/44, 705/10, 18, 35–41, 7.31; 235/380; 283/66.1; 340/425.5
See application file for complete search history.

(56) References Cited

U.S. PATENT DOCUMENTS

| | | |
|---|---|---|
| 4,321,672 A | 3/1982 | Braun et al. |
| 4,355,372 A | 10/1982 | Goldberg |
| 4,495,018 A | 1/1985 | Vohrer |
| 4,633,397 A | 12/1986 | Macco |
| 4,694,397 A | 9/1987 | Vignola |
| 4,722,054 A | 1/1988 | Fukushima |
| 4,745,468 A | 5/1988 | Von Kohorn |
| 4,752,877 A | 6/1988 | Roberts et al. |
| 4,774,664 A | 9/1988 | Gottardy |
| 4,797,911 A | 1/1989 | Marks |
| 4,812,628 A | 3/1989 | Boston |
| 4,914,587 A | 4/1990 | Clouse |
| 4,926,255 A | 5/1990 | Von Kohorn |
| 4,932,046 A | 6/1990 | Ross |
| 4,948,174 A | 8/1990 | Thomson et al. |
| 4,972,504 A | 11/1990 | Daniel, Jr. |
| 4,974,878 A | 12/1990 | Josephson |
| 5,041,972 A | 8/1991 | Frost |
| 5,050,207 A | 9/1991 | Hitchcock |
| 5,121,945 A | 6/1992 | Thomson et al. |
| 5,157,717 A | 10/1992 | Hitchcock |

(Continued)

FOREIGN PATENT DOCUMENTS

GB 002383497 * 6/2003

(Continued)

OTHER PUBLICATIONS

Overseas, the Shock of the Surcharge; David a. Kelly. New York Times. (Late Edition (East Coast)). New York, N.Y.: Feb. 19, 2006. p. 5.6.*

(Continued)

*Primary Examiner* — Harish T Dass
(74) *Attorney, Agent, or Firm* — Hunton & Williams LLP

(57) ABSTRACT

According to an embodiment of the present invention, a computer implemented method and system for automatically implementing a fraud strategy may involve identifying transaction data related to a customer transaction based on a payment instrument; automatically identifying a pattern based on one or more factors associated with a customer spending profile; identifying a potential fraud situation based on the identified pattern and the transaction data; executing an action for the potential fraud situation; and adjusting authorized use of the payment instrument.

27 Claims, 3 Drawing Sheets

U.S. PATENT DOCUMENTS

| | | | |
|---|---|---|---|
| 5,179,584 A | 1/1993 | Tsumura | |
| 5,220,501 A | 6/1993 | Lawlor | |
| 5,225,978 A | 7/1993 | Petersen | |
| 5,239,642 A | 8/1993 | Gutierrez et al. | |
| 5,259,023 A | 11/1993 | Katz | |
| 5,260,778 A | 11/1993 | Kauffman | |
| 5,262,941 A | 11/1993 | Saladin et al. | |
| 5,287,269 A | 2/1994 | Dorrough et al. | |
| 5,361,201 A | 11/1994 | Jost et al. | |
| 5,383,113 A | 1/1995 | Kight | |
| 5,402,474 A | 3/1995 | Miller | |
| 5,424,938 A | 6/1995 | Wagner | |
| 5,465,206 A | 11/1995 | Hill et al. | |
| 5,483,445 A | 1/1996 | Pickering | |
| 5,490,060 A | 2/1996 | Malec | |
| 5,523,942 A | 6/1996 | Tyler | |
| 5,532,920 A | 7/1996 | Hartrick | |
| 5,555,299 A | 9/1996 | Maloney et al. | |
| 5,559,855 A | 9/1996 | Dowens et al. | |
| 5,561,707 A | 10/1996 | Katz | |
| 5,570,465 A | 10/1996 | Tsakanikas | |
| 5,583,759 A | 12/1996 | Geer | |
| 5,594,791 A | 1/1997 | Sziam et al. | |
| 5,599,528 A | 2/1997 | Igaki | |
| 5,615,341 A | 3/1997 | Srikant | |
| 5,631,828 A | 5/1997 | Hagan | |
| 5,652,786 A | 7/1997 | Rogers | |
| 5,659,165 A | 8/1997 | Jennings | |
| 5,684,863 A | 11/1997 | Katz | |
| 5,699,527 A | 12/1997 | Davidson | |
| 5,699,528 A | 12/1997 | Hogan | |
| 5,710,889 A | 1/1998 | Clark et al. | |
| 5,715,298 A | 2/1998 | Rogers | |
| 5,715,450 A | 2/1998 | Ambrose | |
| 5,727,249 A | 3/1998 | Powell | |
| 5,742,775 A | 4/1998 | King | |
| 5,745,706 A | 4/1998 | Wolfberg et al. | |
| 5,757,904 A | 5/1998 | Anderson | |
| 5,758,126 A | 5/1998 | Daniels et al. | |
| 5,761,647 A | 6/1998 | Boushy | |
| 5,765,142 A | 6/1998 | Allred et al. | |
| 5,787,403 A | 7/1998 | Randle | |
| 5,793,846 A | 8/1998 | Katz | |
| 5,794,221 A | 8/1998 | Egendorf | |
| 5,802,498 A | 9/1998 | Comesanas | |
| 5,802,499 A | 9/1998 | Sampson et al. | |
| 5,815,551 A | 9/1998 | Katz | |
| 5,819,226 A * | 10/1998 | Gopinathan et al. | 705/44 |
| 5,819,238 A | 10/1998 | Fernholz | |
| 5,826,241 A | 10/1998 | Stein | |
| 5,832,447 A | 11/1998 | Rieker | |
| 5,832,460 A | 11/1998 | Bednar | |
| 5,835,087 A | 11/1998 | Herz | |
| 5,835,580 A | 11/1998 | Fraser | |
| 5,835,603 A | 11/1998 | Coutts | |
| 5,842,211 A | 11/1998 | Horadon | |
| 5,862,223 A | 1/1999 | Walker | |
| 5,870,456 A | 2/1999 | Rogers | |
| 5,870,721 A | 2/1999 | Norris | |
| 5,870,724 A | 2/1999 | Lawlor | |
| 5,873,072 A | 2/1999 | Kight | |
| 5,875,437 A | 2/1999 | Atkins | |
| 5,884,032 A | 3/1999 | Bateman | |
| 5,884,288 A | 3/1999 | Chang et al. | |
| 5,890,140 A | 3/1999 | Clark et al. | |
| 5,897,625 A | 4/1999 | Gustin | |
| 5,899,982 A | 5/1999 | Randle | |
| 5,903,881 A | 5/1999 | Schrader | |
| 5,920,847 A | 7/1999 | Kolling et al. | |
| 5,923,745 A | 7/1999 | Hurd | |
| 5,940,811 A | 8/1999 | Norris | |
| 5,943,656 A | 8/1999 | Crooks | |
| 5,953,406 A | 9/1999 | LaRue et al. | |
| 5,966,695 A | 10/1999 | Melchione et al. | |
| 5,966,698 A | 10/1999 | Pollin | |
| 5,970,467 A | 10/1999 | Alavi | |
| 5,974,396 A | 10/1999 | Anderson | |
| 5,978,780 A | 11/1999 | Watson | |
| 5,987,435 A | 11/1999 | Weiss et al. | |
| 5,991,750 A | 11/1999 | Craig | |
| 5,995,942 A | 11/1999 | Smith et al. | |
| 5,995,948 A | 11/1999 | Whitford | |
| 6,006,207 A | 12/1999 | Mumick et al. | |
| 6,016,344 A | 1/2000 | Katz | |
| 6,016,482 A | 1/2000 | Molinari et al. | |
| 6,018,722 A | 1/2000 | Ray et al. | |
| 6,026,370 A | 2/2000 | Jermyn | |
| 6,029,139 A | 2/2000 | Cunningham et al. | |
| 6,032,125 A | 2/2000 | Ando | |
| 6,038,552 A | 3/2000 | Fleischl et al. | |
| 6,049,782 A | 4/2000 | Gottesman et al. | |
| 6,055,510 A | 4/2000 | Henrick | |
| 6,058,378 A | 5/2000 | Clark et al. | |
| 6,067,533 A | 5/2000 | McCauley et al. | |
| 6,070,147 A | 5/2000 | Harms et al. | |
| 6,078,892 A | 6/2000 | Anderson et al. | |
| 6,088,685 A | 7/2000 | Kiron et al. | |
| 6,098,052 A | 8/2000 | Kosiba et al. | |
| 6,100,891 A | 8/2000 | Thorne | |
| 6,101,486 A | 8/2000 | Robert et al. | |
| 6,119,103 A | 9/2000 | Basch et al. | |
| 6,148,293 A | 11/2000 | King | |
| 6,151,584 A | 11/2000 | Papierniak et al. | |
| 6,157,924 A | 12/2000 | Austin | |
| 6,212,178 B1 | 4/2001 | Beck et al. | |
| 6,226,623 B1 | 5/2001 | Schein et al. | |
| 6,230,287 B1 | 5/2001 | Pinard et al. | |
| 6,233,332 B1 | 5/2001 | Anderson et al. | |
| 6,233,566 B1 | 5/2001 | Levine et al. | |
| 6,278,981 B1 | 8/2001 | Dembo et al. | |
| 6,301,567 B1 | 10/2001 | Leong et al. | |
| 6,304,653 B1 | 10/2001 | O'Neill et al. | |
| 6,304,858 B1 | 10/2001 | Mosler et al. | |
| 6,321,212 B1 | 11/2001 | Lange | |
| 6,324,525 B1 | 11/2001 | Kramer et al. | |
| 6,338,047 B1 | 1/2002 | Wallman | |
| 6,393,409 B2 | 5/2002 | Young et al. | |
| 6,405,179 B1 | 6/2002 | Rebane | |
| 6,418,419 B1 | 7/2002 | Nieboer et al. | |
| 6,430,545 B1 | 8/2002 | Honarvar et al. | |
| 6,456,983 B1 | 9/2002 | Keyes et al. | |
| 6,480,850 B1 | 11/2002 | Veldhuisen | |
| 6,513,019 B2 | 1/2003 | Lewis | |
| 6,553,113 B1 | 4/2003 | Dhir et al. | |
| 6,578,015 B1 | 6/2003 | Haseltine et al. | |
| 6,658,393 B1 | 12/2003 | Basch et al. | |
| 6,804,346 B1 | 10/2004 | Mewhinney | |
| 6,823,319 B1 | 11/2004 | Lynch et al. | |
| 6,925,441 B1 | 8/2005 | Jones, III et al. | |
| 6,988,082 B1 | 1/2006 | Williams et al. | |
| 7,206,768 B1 | 4/2007 | deGroeve et al. | |
| 7,310,618 B2 | 12/2007 | Libman | |
| 7,707,089 B1 | 4/2010 | Barton et al. | |
| 2001/0032158 A1 | 10/2001 | Starkman | |
| 2001/0032159 A1 | 10/2001 | Starkman | |
| 2001/0032176 A1 | 10/2001 | Starkman | |
| 2001/0034682 A1 | 10/2001 | Knight et al. | |
| 2001/0042034 A1 | 11/2001 | Elliott | |
| 2001/0044293 A1 | 11/2001 | Morgan | |
| 2001/0047489 A1 | 11/2001 | Ito et al. | |
| 2002/0026394 A1 | 2/2002 | Savage et al. | |
| 2002/0059141 A1 | 5/2002 | Davies et al. | |
| 2003/0101119 A1 | 5/2003 | Persons et al. | |
| 2003/0163403 A1 | 8/2003 | Chen et al. | |
| 2003/0208441 A1 | 11/2003 | Poplawski et al. | |
| 2004/0252823 A1 | 12/2004 | Becerra et al. | |
| 2009/0132347 A1 | 5/2009 | Anderson et al. | |

FOREIGN PATENT DOCUMENTS

| | | |
|---|---|---|
| JP | 7-152960 | 6/1995 |
| JP | 2007088822 | 4/2007 |
| WO | 01/86524 | 11/2001 |

OTHER PUBLICATIONS

What happened to neural nets? Sidney Hill Jr. Collections & Credit Risk. New York: Aug. 1999. vol. 4, Iss. 8; p. 39, 5 pgs.*

Delivering the Right Information to the Right Resource or Every Customer Interaction; Intelligent Callrouter, www.geotel.com/solutions/icr/default/htm, 1998, 1 page.

Global Corruption Report 2004, Transparency International, Pluto Press, www.globalcorrupt, ISBN 07453 2231, Jun. 26, 2005.

Rial, Astrid, How to Monitor Collectors, Credit Card Management, Jul. 2000, vol. 13, Iss. 3:p. 65, 4 pages.

Keep the Change Savings Service, Bank of America, Retrieved from the internet on Jan. 27, 2006 at <https://www.bankofamerica.com/deposits/checksave/apps/ktc/ktc_terms.cfm>.

Computer Telephony Solutions, The Customer Interaction Specialists, Computer Telephony Solutions, Internet, May 25, 1999.

Margaret Hargreaves and Paul Elwood, The Evaluation of the Expanded EBT Demonstration in Maryland; vol. 1: System Start Up, Conversion and Expansion, Abt Associates, Inc., May 1994, 149 pages.

Bennet Yee, Using Secure Coprocessors, School of Computer Science, Carnegie Mellon University, Advanced Research Projects Agency, May 1994, 104 pages.

Smart Cards: Big Brother's Little Helpers, The Privacy Committee of New South Wales, No. 66, Aug. 1995, 78 pages.

FOIA #09-02-12, Responsive Records, Book #5, Mar. 12, 2009, 415 pages.

Debit And Stored Value Cards For Government: A Growing Trend But States Could Do More, A Survey and White Paper of the EBT Industry Council, Electronic Funds Transfer Association, Nov. 2006, 78 pages.

* cited by examiner

METHOD AND SYSTEM FOR AUTOMATING FRAUD AUTHORIZATION STRATEGIES

RELATED APPLICATIONS

This patent application is a Continuation of U.S. patent application Ser. No. 12/046,630, filed Mar. 12, 2008 now U.S. Pat. No. 7,707,089 entitled "METHOD AND SYSTEM FOR AUTOMATING FRAUD AUTHORIZATION STRATEGIES", the disclosure of which is hereby incorporated by reference in its entirety.

FIELD OF THE INVENTION

The present invention relates generally to automating fraud authorization strategies, and more specifically to identifying potential fraud situations based on pattern detection and executing a specific targeted action in response.

BACKGROUND OF THE INVENTION

Currently, fraud pattern detection is a manual process that involves culling through billions of transactions to find fraud patterns. Fraud detection is not an exact science and often transactions from good customers are declined as well as fraudsters, thereby negatively impacting customer relations. The timeliness of fraud detection is also a major concern. In many instances, fraudulent charges are not discovered until the customer receives his or her statement and disputes the charge. By this time, fraudsters have made a major negative impact on their targets.

When fraudulent charges are detected, the customer will be told that his current card will be de-activated and a new card is on the way. During this waiting period, the customer is not able to use his card until he receives his new one.

Other drawbacks may also be present.

SUMMARY OF THE INVENTION

Accordingly, one aspect of the invention is to address one or more of the drawbacks set forth above. According to an embodiment of the present invention, a method and system facilitate the ability to automate fraud strategies. An embodiment of the present invention is directed to real-time systemic fraud pattern identification, dynamic strategy adaptation, robust strategy monitoring and maintenance tools for tuning and modification.

According to an exemplary embodiment of the present invention, a computer implemented method for automatically implementing a fraud strategy comprising the steps of: identifying transaction data related to a customer transaction based on a payment instrument; automatically identifying a pattern based on one or more factors associated with a customer spending profile; identifying a potential fraud situation based on the identified pattern and the transaction data; executing an action for the potential fraud situation; and adjusting authorized use of the payment instrument.

In accordance with other aspects of this exemplary embodiment of the present invention, the method may further include the one or more factors comprise one or more of merchant data, customer spending data, customer demographic data, profitability data and delinquency data; wherein the step of identifying a potential fraud situation further comprises the step of determining the customer's current location relative to the location of the customer transaction; wherein the step of identifying a potential fraud situation further comprises the step of determining the customer's transaction history compared to the customer transaction; wherein the action comprises authorizing limited use of the payment instrument; wherein the limited use is one or more of location limited, transaction type limited and merchant limited; wherein the action further comprises determining a root cause of the potential fraud situation and flagging similarly situated consumers for a potential fraud situation; wherein the step of identifying a potential fraud situation further comprises the step of applying one or more exclusions for fraud detection; wherein the one or more exclusions comprise one or more of customer travel and emergency expenses; dynamically adjusting the one or more factors associated with the pattern.

According to an exemplary embodiment of the present invention, a computer implemented system for automatically implementing a fraud strategy, the method comprising: a pattern detection module for identifying transaction data related to a customer transaction based on a payment instrument; automatically identifying a pattern based on one or more factors associated with a customer spending profile; and identifying a potential fraud situation based on the identified pattern and the transaction data; and an action module for executing an action for the potential fraud situation; and adjusting authorized use of the payment instrument.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF EXEMPLARY EMBODIMENT(S)

An embodiment of the present invention is directed to real-time systemic fraud pattern identification, dynamic strategy adaptation, robust strategy monitoring and maintenance tools and capabilities for tuning and modification.

An embodiment of the present invention may include a Pattern Detection Module, a Dynamic Rules Adaptation Engine, and a Rules Management and Execution Module. The Pattern Detection Module may use real time data to detect useful patterns, assess likelihood of an expected result and adjust future pattern identification accuracy by learning from actual results. These patterns may include fraud transactions, life event changes, sales opportunities, and delinquency probability. The Dynamic Rules Adaptation Engine uses real time data and detected patterns to dynamically create and/or change strategies to alter the outcome of an expected result, change cardholder behavior and avoid risk. The Rules Management and Execution Module provides a user interface to analyze, interpret, report on, tune and manage the overall effectiveness of the Pattern Detection Module and Dynamic Rules Adaptation Engine.

While the detailed description is directed to an exemplary application involving fraud strategies, the various embodiments of the invention may be applied to other scenarios and applications involving identifying an event based on pattern recognition. Other applications may be applied in varying scope.

Figure 1:
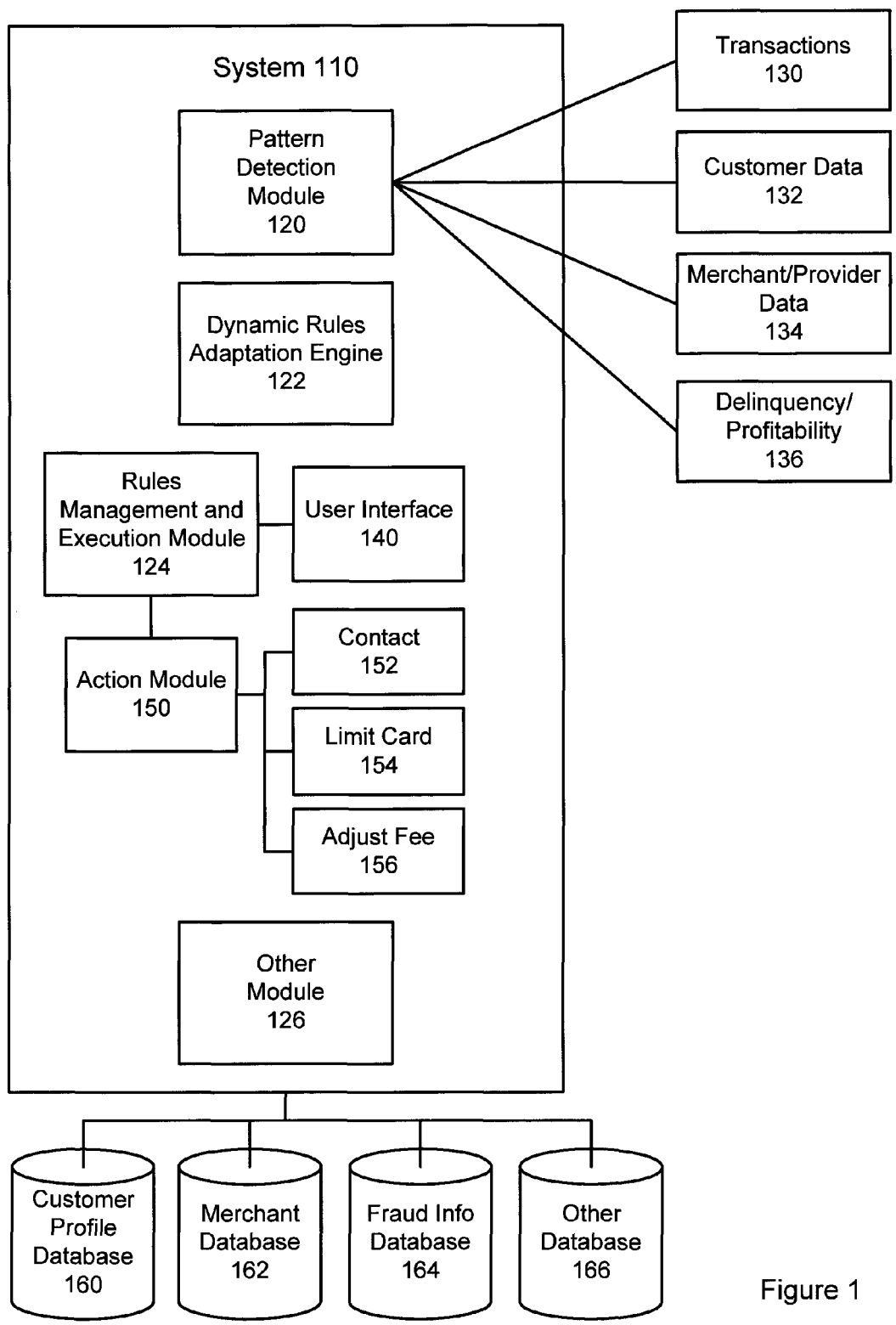
FIG. 1 is an exemplary diagram of a system for automated fraud strategy, according to an embodiment of the present invention.

FIG. 1 is an exemplary diagram of a system for automated fraud strategies, according to an embodiment of the present invention. System 100 of an embodiment of the present invention may include a Pattern Detection Module 120, Dynamic Rules Adaptation Module 122, Rules Management and Execution Module 124 and Other Module 126. While a single illustrative block, module or component is shown, these illustrative blocks, modules or components may be multiplied for various applications or different application environments. In addition, the modules or components may be further combined into a consolidated unit. Other architectures may be realized. The modules and/or components may be further duplicated, combined and/or separated across multiple systems at local and/or remote locations.

Upon receiving transaction or other trigger data, Pattern Detection Module 120 may access databases and/or other sources of information to identify one or more patterns useful in identifying a potential fraud situation for a particular customer or type of customer. For example, Pattern Detection Module 120 may access and/or maintain Customer Profile Database 160, Merchant Database 162, Fraud Database 164, and/or other database 166. The databases may be further combined and/or separated. The databases may reside at a single location or separated through multiple locations. In addition, the databases may be supported by System 110 or an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different processing environments and platforms.

Customer Profile Database 162 may store and maintain profile information for each customer or type of customer. Each profile may include personal information, contact information, etc. Other customer information may include demographic data, customer loyalty and associations, customer participation in other services and products, spending profile, spending patterns, preferred transaction modes, recent transactions, travel patterns, etc.

Merchant Database 164 may store and maintain data concerning types of services and products sold to a particular customer, type of customer, region, etc. Merchant data may also include details of transactions, including Internet transactions, in person transactions, mail order transactions, domestic and foreign transactions, etc. Merchant data may also include fraud data concerning recent fraud activities, fraud patterns for the merchant or type of merchant, etc. Merchant data may also include promotional opportunities and/or other sales data.

Fraud Database 166 may store and maintain data concerning fraud patterns. In addition, Fraud Database 166 may also store information from a mystery shopper. An embodiment of the present invention may test the system's fraud detection ability, help identify fraud patterns and provide additional useful data. For example, a mystery shopper feature of an embodiment of the present invention may provide additional data to help detect useful patterns and better identify fraudulent activities. In this example, the mystery shopper may purposefully commit fraudulent activities so that the system can be tested to see how quickly and accurately fraud is identified and to determine whether an appropriate action is performed. According to another example, data representative of fraudulent activities may provided. The data may be manually entered, generated by a software or an algorithm and/or other mechanism for providing representative data.

Pattern Detection Module 120 may access real time data to detect useful patterns, assess likelihood of an expected result and adjust future pattern identification accuracy by learning from actual results. These patterns could include fraud transactions, life event changes, sales opportunities, and delinquency probability. Pattern Detection Module 120 may detect a pattern based on a trigger event, such as a customer transaction. For example, in response to the trigger event, Module 120 may analyze information related to the customer, the associated merchant, trigger event and/or other data. For example, the trigger event may provide information on when and where the event occurred. Merchant data may provide information concerning the merchant—the type of services provided, products sold, the type of transaction (e.g., internet transaction, phone order, in person, etc.). In addition, the merchant may have a history of fraud or very few fraud activities. Merchant data may also provide potential sales opportunities. An embodiment of the present invention may generate logic patterns which may be used to provide targeted marketing opportunities. For example, an embodiment of the system may identify wedding related purchases (e.g., wedding band, deposit for banquet site, deposit for wedding photographer, etc.) for a customer and determine that the customer is getting married in the near future (or by a certain date). The exemplary system may send a communication (e.g., text message, etc.) to the customer to confirm the detected pattern. The exemplary system may then generate targeted advertisements and/or other sales opportunities directed to wedding related services and/or products to the customer. The exemplary system may also inform targeted merchants of the potential sales opportunities where the merchants may then provide specific targeted sales opportunities to the customer. For example, the customer may receive a 15% discount on flowers from a local merchant. According to another example, the customer may receive targeted advertisement for honeymoon adventures. In addition, a local limousine service may be made aware of this potential sales opportunity and contact the customer directly.

Customer information may include demographic information, customer loyalty, customer relations (e.g., whether the customer is enrolled in other products or services, etc.), contact information (e.g., home phone, work phone, cell phone, text message, email, etc.) spending activity, spending profile, current location, recent purchases, travel patterns, family information, etc. An embodiment of the system analyzes the customer's pattern relative to the trigger event. If the transaction does not fit the customer's pattern, the system of an embodiment of the present invention may determine an appropriate action in response.

If there is minimal or no useful customer information, the system may identify a customer with a similar profile (e.g., a nearest neighbor) and access information from that customer or type of customer to determine a pattern. This may be particularly useful for new or recent customers. In addition, the system may use data from one or more similar customers to develop a hypothetical customer and use this data to identify relevant patterns.

Accordingly, an embodiment of the present invention may receive a trigger event (or other data) and identify one or more patterns based on the relevant trigger data, merchant data, customer data and/or other information. As new information or updated data becomes available, the system continuously updates the available information to more accurately pattern a situation. Other data may also be used to identify a pattern.

For example, holiday spending seasons, general economic data, world events, geographical information, weather conditions and/or other data may affect customer spending habits.

An embodiment of the present invention may provide customer specific monitoring for a targeted response. For example, an embodiment of the present invention may track and monitor a customer's spending, transactional and event data to accurately identify fraud activities. For example, the system may realize that Customer A who makes an in person transaction in California, cannot make another in person transaction in London an hour later. In another example, the system recognizes potential fraud when Customer B who rarely travels and never makes mail order/telephone order ("MOTO") transactions starts making recurring transactions for a web hosting service followed by several card present transactions in Moscow. The system may also consider approving or declining questionable charges based on available contact information (e.g., home number, recent interaction, text messaging activation, etc.).

Dynamic Rules Adaptation Engine 122 may use real time data and detected patterns to dynamically create and/or change strategies to alter the outcome of an expected result, change cardholder behavior and avoid risk.

An embodiment of the present invention provides the ability to trace a fraud occurrence to a root cause and look for potentially other related fraud activities. For example, the system may determine that a fraud occurred at a particular restaurant on a certain day—other patrons of the restaurant may be flagged and closely monitored for potential fraud activity. This data may then be used to better model and predict fraudulent activities.

Rules Management and Execution Module 124 may provide a User Interface 140 to analyze, interpret, report on, tune and manage the overall effectiveness of the Pattern Detection Module and Dynamic Rules Adaptation Engine. The User Interface 140 may be provided via the Internet, Intranet or other computer network. Action Module 150 provides a targeted response to the trigger event and identified pattern. For example, the response may be one or a combination of approve the transaction, decline the transaction, hold the transaction and investigate and/or monitor the customer's transactions. Other actions may include making a customer contact, as shown by 152. For example, the customer may be contacted via text message and asked to confirm whether a transaction is valid or not. If the payment instrument is jointly owned, the message may be sent to both or all customers to confirm the transaction.

Another action may involve limiting the payment instrument's authorized use until a new card is received by the customer, as shown by 154. For example, the system may detect fraud activities through Internet charges. Accordingly, the card may be limited to in-person transactions to limit the detected fraudulent activities. Rather than shutting down the potentially compromised card, the system may authorize the card for limited use while a new card is being processed. For example, a customer may be authorized to make local in person transactions. This allows for safe customer spending while limiting the known fraud risk. Accordingly, an embodiment of the present invention applies customer specific strategies to effectively address fraudulent activities while promoting customer satisfaction.

According to another example, the system may adjust the interchange fee, as shown by 156. This features enables the system to adjust the interchange fee with various merchants and/or other providers. For example, if the merchant is an approved merchant, the system may provide a lower interchange fee. An approved merchant may mean that the merchant has an association with the system or other indication of fraud protection. For example, when the merchant is associated with a payment network, the system is more equipped to detect and control fraud. Accordingly, the system can offer a lower interchange rate. Other adjustments or benefits (e.g., credit, lower fees, lower transaction costs, etc.) may be offered to approved merchants and/or other providers.

Figure 2:
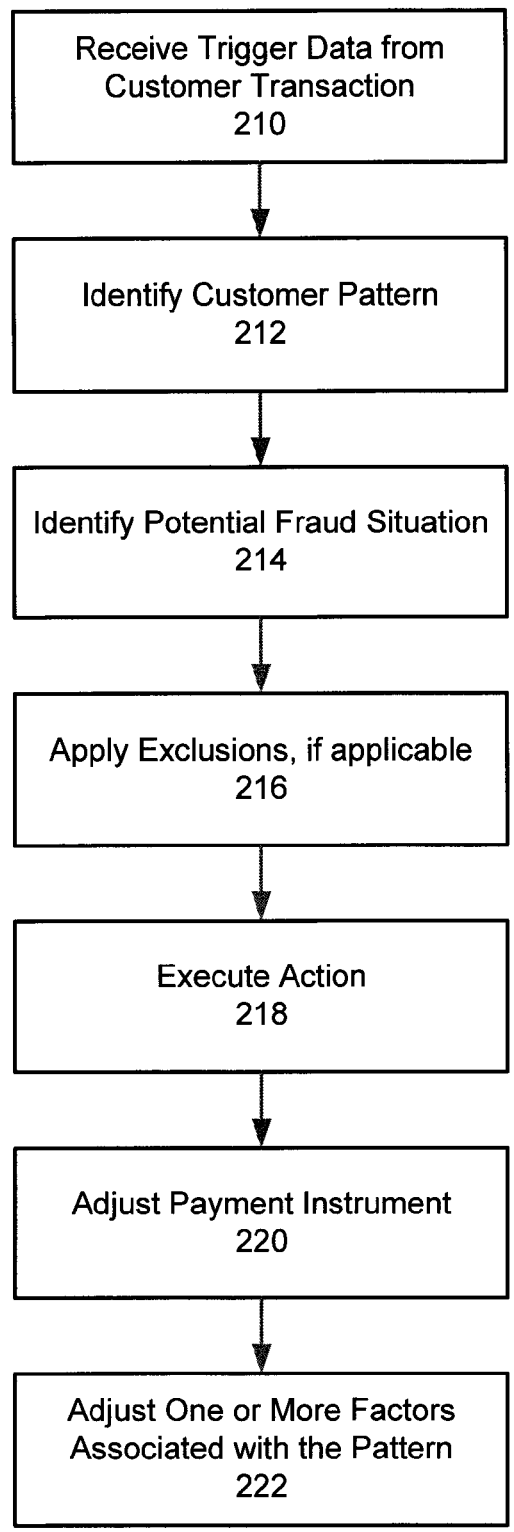
FIG. 2 is an exemplary flowchart illustrating a method for automating fraud strategies, according to an embodiment of the present invention.

FIG. 2 is an exemplary flowchart illustrating a method for automated fraud authorization strategies, according to an embodiment of the present invention. At step 210, trigger data for a customer transaction based on a payment instrument may be received. At step 212, based on the trigger data, one or more patterns may be identified. At step 214, a potential fraud situation may be identified. At step 216, one or more exclusions may be applied, if applicable. At step 218, a targeted action may executed in response to the potential fraud situation. At step 220, the payment instrument may be adjusted. At step 222, one or more factors associated with the pattern may be adjusted. These steps will be described in greater detail below.

At step 210, trigger data for a customer transaction based on a payment instrument may be received. The trigger data may be information concerning the customer's transaction. This information may include type of transaction, mode of transaction (e.g., Internet, in person, mail order, phone order, etc.), time and place of transaction, etc.

At step 212, one or more patterns may be identified. A customer specific pattern may be developed to determine whether the customer transaction is possibly fraudulent or not. The customer pattern may include a spending pattern to determine whether the customer transaction is the type of transaction the customer normally makes or would normally make. If the transaction is determined to be consistent with one or more patterns, the transaction may be approved.

At step 214, a potential fraud situation may be identified. Based on a comparison of the customer transaction with one or more customer specific patterns, a potential fraud situation may be identified. For example, based on a customer spending profile which indicates primarily all in person transactions of low-ticket purchases, it may be determined that several online purchases for high end electronics are potential fraudulent charges. Other customer specific patterns may be identified and used to accurately flag fraudulent transactions.

At step 216, the system of an embodiment of the present invention may also automatically approve transactions based on a class of excluded transactions that will not alert the system for potential fraud. For example, excluded transactions may include funeral expenses, medical emergencies, veterinarian services, and/or other purchases and services that are rarely fraudulent activities. According to another example, the customer may inform the system that he or she is going on an extended overseas trip. For example, the system may detect customer travel by airline ticket purchases and hotel reservations. According to another example, the customer may sign up for an exception or respond to a system initiated inquiry indicating future plans (e.g., travel plans, home renovation plans, other plans that involve large and/or frequent purchases, etc.). This information may be used to exempt and override any fraud detection for overseas transactions at the destination country or countries during the travel period. The system may also be alerted that any local purchases near the home town during this time period will be flagged for potential fraud.

At step 218, a targeted action may be executed in response to the potential fraud situation. The system of an embodiment of the present invention may approve, decline, hold, monitor and/or perform other actions in response to the potential fraud. In addition, the system of an embodiment of the present invention may initially approve the transaction based on the available contact information. If the customer is enrolled in a text messaging service, the system may determine that confirmation will be readily available.

At step 220, the payment instrument may be adjusted. Rather than shutting down the payment instrument (e.g., credit card, debit card, RFID, token, etc.), an embodiment of the present invention may limit the authorized use of the payment instrument to minimize the known risk. For example, if the fraud activity is Internet based transactions, the customer may continue to use the card for in-person transactions only. If the fraud activity is in California and the customer lives in New York, the system may authorize purchases originating from New York or within a radius of the customer's home, work and/or other location. Other limitations may be placed on the card to enable continued use of the card while a new card is being processed.

At step 222, one or more factors associated with the pattern (s) may be adjusted. The system may update one or more databases with new or updated information. Therefore, as the customer evolves, the pattern will reflect changes, including spending habit changes, life changes (e.g., new child, new home, travel patterns, etc.). For example, a young couple may travel abroad at least three times a year to different countries. The system may learn that the couple recently had a child and no longer takes overseas adventure vacations but rather takes family vacations closer to home. As the child or children grow up, the family may continue their love of travel and take family vacations across the United States. Later on in life as the children start college, the couple may pick up their love of travel to foreign countries once again. The system of an embodiment of the present invention will learn these travel patterns and continuously update customer data to accurately reflect the customer's current status and more accurately detect fraudulent activities.

According to an exemplary scenario, Customer A lives in California and every year he travels to London for New Year's. While he is in London he uses his card for every aspect of his trip (e.g., hotel, restaurants, bars, shopping, etc.), and during this time he never makes Internet or MOTO transactions. During the year, the system understands that he infrequently uses his card and his transactions are predominantly face to face transactions in and around the Los Angeles area. He occasionally buys items over the Internet. While in London this year, a clerk at a local bar writes down Customer A's account information and attempts to use it for a $2000 MOTO transaction.

Starting with the first transaction overseas, the system of an embodiment of the present invention would recognize that Customer A has been to London during the same time period in prior years and would approve these transactions. When the MOTO transaction is interpreted by the system however, the system would recognize that Customer A has never before attempted an overseas MOTO transaction and had never made a single transaction over $1000, that was not a travel and entertainment related transaction. The system of an embodiment of the present invention would decline the MOTO transaction and determine that Customer A is enrolled in the Text messaging program. The system may trigger a text message to Customer A to asking whether the $2000 MOTO transaction is his. Customer A may respond via the voice recognition unit (VRU) or other mode of communication that the transaction is not his and may then be routed to a Fraud representative. The Fraud representative processes a Lost/Stolen report and issues a new account/card to Customer A. This process triggers a response to the system to confirm Fraud and to advise the system to allow card present transactions until Customer A receives his new card. The system of an embodiment of the present invention adjusts the strategy assigned to Customer A's account to enable Customer A to continue to use his card until his new card is received. Once Customer A receives his new card, no further charges will be allowed on Customer A's old account number.

According to another exemplary application, Customer B uses her card to buy almost everything she purchases in her hometown of South Bend, Ind. She rarely travels and only occasionally uses her card for Internet transactions. Customer B's account information is compromised when a hacker breaks into a local merchant's network. A $150 recurring transaction for a web hosting service is received for authorization and is followed by several card present transactions in Moscow.

The system of an embodiment of the present invention would be suspect of the $150 web hosting transaction as Customer B has never used a Web Hosting service before and because the merchant has had a higher rate of fraud in the past then the norm. It would approve the transaction but would decide to trigger a call to the customer to determine whether the transaction was valid. When the card present transactions in Moscow are submitted, the system would recognize and decline these as fraud for the following several reasons. The transactions do not fit within Customer B's normal spending pattern. More importantly, the system recognizes that they could not have been transacted with Customer B's card as recent transaction history shows Customer B's card to be in South Bend—not Moscow. Card present transactions can not be charged back and therefore represent an increased profit and loss (PL) risk. The risk level is now increased as these transactions follow the suspect Web Hosting transaction. The system would then update the call back information to reflect an active fraud status and advise the Fraud representative to close the account and issue a new one. Customer B's interim strategy would be updated to only allow card present transactions in South Bend and decline all others until Customer B's new card is received.

According to yet another exemplary application, Customer C is a new customer and has received his new card just in time for the holiday season. He activates his new card from his home telephone and heads to his local mall to do his Christmas shopping. In the next hour, Customer C uses his card over 10 times and uses up to 75% of his available line.

The system of an embodiment of the present invention recognizes that Customer C is new with the first transaction and realizes that Customer C has no past history. The system would then look for transactional data for customers like Customer C (e.g., new customer, local card present usage, activated, holiday spending, etc.) and determine that Customer C's transactions represent a low fraud risk. To be sure, the system would trigger a friendly call to the customer to welcome Customer C and in the course of that call a Fraud representative would confirm the transactions and try to cross sell a product to Customer C. Customer C's behavior and corresponding confirmation of no fraud would be used by the system to make future decisions for customers like Customer C.

Figure 3:
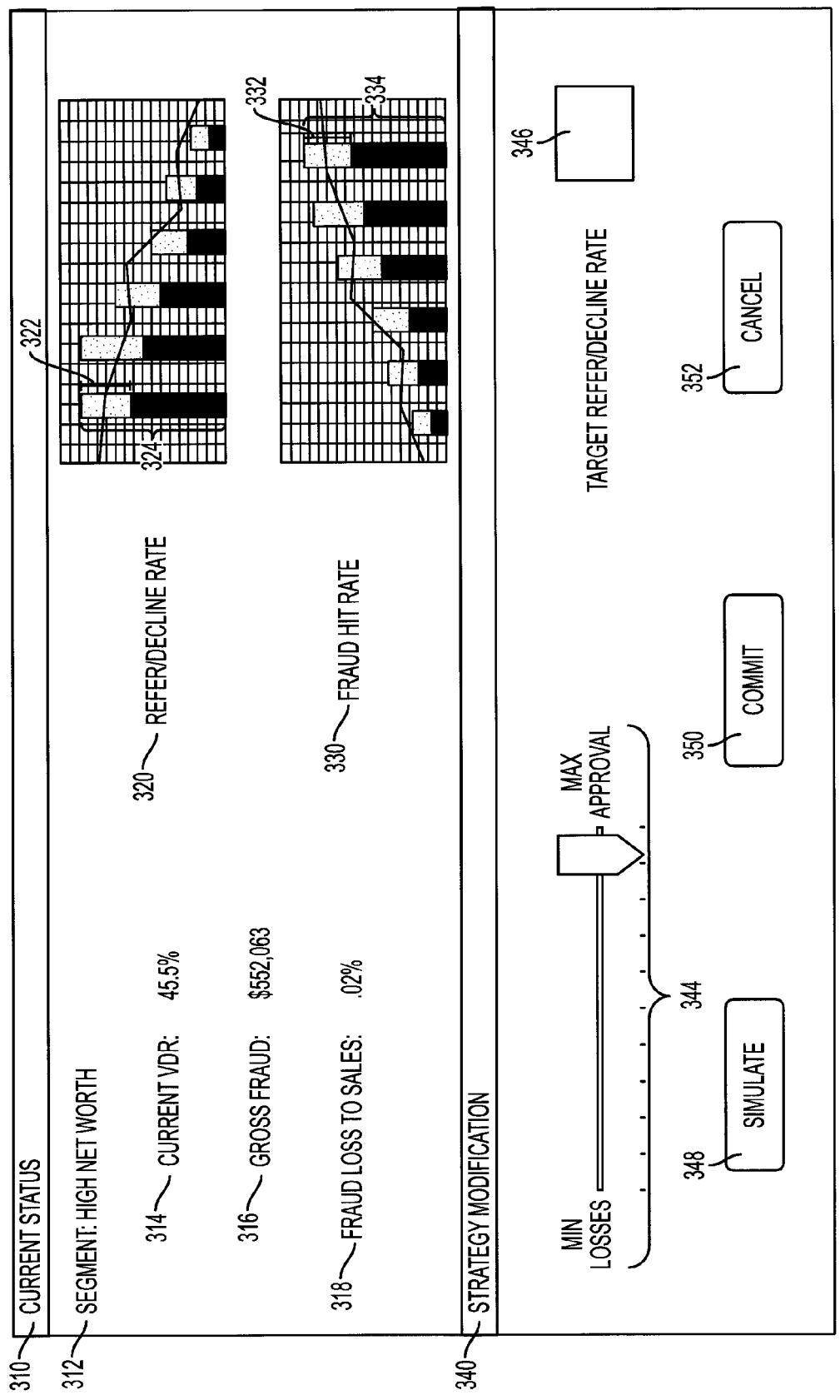
FIG. 3 is an exemplary diagram of details of a user interface, according to an embodiment of the present invention.

FIG. 3 is an exemplary diagram of details of a user interface, according to an embodiment of the present invention. According to an exemplary embodiment of the present invention, User Interface may Current Status Section 310 and a Strategy Modification Section 320.

Current Status Section 310 provides details on the current status of fraudulent activities for a person, group of customers, a business, a segment of a business or other sector. Filters may be applied to view cross sectional views for various filtered groups. In this example, Segment 312 represents high net worth customers. "Current VDR" 314 represents the current value detection rate. "Gross Fraud" 316 represents the amount of fraudulent activities translated into a dollar amount. "Fraud loss to sales" 318 represents the percentage of losses in sales to fraudulent activities. Refer/Decline rate provides a graphical representation 320 of the refer/decline rate for a given time period. The vertical bar represents the rate of disruption caused to the customer's use of a product. The top portion 322 represents denials or declines of customer transactions for suspected fraud activities and vertical bar 324 represents all activities. Fraud Hit Rate provides a graphical representation 330 of fraudulent hits for a given time period. The vertical bar represents the measure of fraud in relation to total activities. The top portion 332 represents fraud activities and the vertical bar 334 represents all activities.

Strategy Modification Section 340 enables user interaction to adjust or modify fraud strategies. For high net worth individuals, a higher maximum approval rate may be preferred. The user may use the sliding scale 344 to identify a target rate between minimum losses and maximum approval. Minimum losses represents the situation where most or all transactions are declined. Maximum approval represents the situation where most or all transactions are approved. According to another example, the Target Refer/Decline rate 346 may be entered as a numerical representation (e.g., 0 to 100 or other range). A "Simulate" button 348 may provide a simulation based on the current adjustments. The simulation may then be displayed in Current Status 310. If the results are favorable, the user may commit the adjustments by selecting the "Commit" button 350. Otherwise, the user may cancel the adjustments by selecting the "Cancel" button 352.

According to an embodiment of the invention, the systems and processes described in this invention may be implemented on any general or special purpose computational device, either as a standalone application or applications, or even across several general or special purpose computational devices connected over a network and as a group operating in a client-server mode. According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an AS/400-based operating system. It is further noted that the software described herein may be tangibly embodied in one or more physical media. For example, the computer-usable and writeable medium may be comprised of a CD ROM, a floppy disk, a hard drive, read only memory (ROM), random access memory (RAM), any other computer-usable medium as well as other physical media capable of storing software and/or combinations thereof. One or more of the components of the system or systems embodying the present invention may comprise computer readable program code in the form of functional instructions stored in the computer-usable medium such that when the computer-usable medium is installed on the system or systems, those components cause the system to perform the functions described. The computer readable program code for the present invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used. According to one specific embodiment of the present invention, the system may comprise components of a software system. The system may operate on a network and may be connected to other systems sharing a common database. Other hardware arrangements may also be provided.

While the invention has been particularly shown and described within the framework of automated fraud strategies, it will be appreciated that variations and modifications can be effected by a person of ordinary skill in the art without departing from the scope of the invention. Furthermore, one of ordinary skill in the art will recognize that such processes and systems do not need to be restricted to the specific embodiments described herein. Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

The invention claimed is:

1. A computer implemented method for automatically implementing a fraud strategy, the method comprising the steps of:
using a computer processor:
receiving transaction data related to a customer transaction based on a payment instrument;
retrieving a customer spending profile for the customer from at least one database;
automatically identifying a spending pattern based on one or more factors associated with the customer spending profile;
automatically determining that the customer transaction is a normal transaction based on a consistency between the identified spending pattern and the transaction data; and
approving the customer transaction.

2. The method of claim 1, wherein the one or more factors associated with the customer spending profile comprise one or more of merchant data, customer spending data, customer demographic data, profitability data and delinquency data.

3. The method of claim 1, wherein the determination that the customer transaction is a normal transaction is further based on one or more exclusions for fraud detection.

4. The method of claim 3, wherein the one or more exclusions comprise one or more of customer travel and emergency expenses.

5. The method of claim 1, wherein the determination that the customer transaction is a normal transaction is further based on one or more exceptions.

6. The method of claim 5, wherein the exception is submitted by the customer.

7. The method of claim 1, wherein the determination that the customer transaction is a normal transaction is further based on a current location of the customer relative to the location of the customer transaction.

8. The method of claim 1, further comprising:
updating the customer spending profile based on the customer transaction.

9. The method of claim 1, wherein the payment instrument is at least one of a physical device and an account.

10. A computer implemented method for automatically implementing a fraud strategy, the method comprising the steps of:
using a computer processor:
receiving transaction data related to a customer transaction based on a payment instrument;
retrieving a customer spending profile for the customer from at least one database;
automatically identifying a spending pattern based on one or more factors associated with the customer spending profile;
automatically determining that the customer transaction is a normal transaction based on a consistency between the identified spending pattern and the transaction data; and
updating the customer spending profile based on the customer transaction.

11. The method of claim 10, wherein the one or more factors associated with the customer spending profile comprise one or more of merchant data, customer spending data, customer demographic data, profitability data and delinquency data.

12. The method of claim 10, wherein the determination that the customer transaction is a normal transaction is further based on one or more exclusions for fraud detection.

13. The method of claim 12, wherein the one or more exclusions comprise one or more of customer travel and emergency expenses.

14. The method of claim 10, wherein the determination that the customer transaction is a normal transaction is further based on one or more exceptions.

15. The method of claim 14, wherein the exception is submitted by the customer.

16. The method of claim 10, wherein the determination that the customer transaction is a normal transaction is further based on a current location of the customer relative to the location of the customer transaction.

17. The method of claim 10, further comprising:
updating the customer spending profile based on the customer transaction.

18. A computer implemented system for automatically implementing a fraud strategy, comprising:
at least one computer processor;
at least one computer memory;
a pattern detection module for identifying transaction data related to a customer transaction based on a payment instrument; automatically identifying a spending pattern based on one or more factors associated with a customer spending profile; and determining that the customer transaction is a normal transaction based on a consistency between the identified spending pattern and the transaction data; and
an action module for performing at least one of approving the transaction and updating the customer spending profile based on the customer transaction.

19. The system of claim 18, wherein the one or more factors associated with the customer spending profile comprise one or more of merchant data, customer spending data, customer demographic data, profitability data and delinquency data.

20. The system of claim 18, wherein the pattern detection module further determines the customer's current location relative to the location of the customer transaction.

21. The system of claim 18, wherein the pattern detection module further determines the customer's transaction history compared to the customer transaction.

22. The system of claim 18, wherein the action module further applies one or more exclusions for fraud detection.

23. The system of claim 22, wherein the one or more exclusions comprise one or more of customer travel and emergency expenses.

24. The system of claim 18, wherein the action module further applies one or more exceptions.

25. The system of claim 24, wherein the exception is submitted by the customer.

26. The system of claim 18, wherein the payment instrument is at least one of a physical device and an account.

27. A computer implemented method for automatically implementing a fraud strategy, the method comprising the steps of:
using a computer processor:
receiving transaction data related to a customer transaction based on a payment instrument;
retrieving a customer spending profile for the customer from at least one database;
automatically identifying a spending pattern based on one or more factors associated with the customer spending profile;
automatically determining that the customer transaction is a normal transaction based on a consistency between the identified spending pattern, the transaction data and the application of one or more exclusions for fraud detection and one or more exceptions;
approving the customer transaction; and
updating the customer spending profile based on the customer transaction;
wherein the one or more factors associated with the customer spending profile comprise one or more of merchant data, customer spending data, customer demographic data, profitability data, delinquency data; and
wherein the one or more exclusions comprise one or more of customer travel and emergency expenses; and
wherein the exception is submitted by the customer.

* * * * *